United States Patent
Mitra et al.

(10) Patent No.: US 10,776,816 B2
(45) Date of Patent: Sep. 15, 2020

(54) SYSTEM AND METHOD FOR BUILDING A TARGETED AUDIENCE FOR AN ONLINE ADVERTISING CAMPAIGN

(71) Applicant: Wal-Mart Stores, Inc., Bentonville, AR (US)

(72) Inventors: Abhimanyu Mitra, San Jose, CA (US); Patrick Lloyd Harrington, Jr., Boulder, CO (US); Nikhil Raj, Menlo Park, CA (US); Somnath Banerjee, Foster City, CA (US); Gary Tang, San Francisco, CA (US); Zachary Poley, San Bruno, CA (US); Yun Zhang, San Bruno, CA (US); Galana Gebisa, Sunnyvale, CA (US); Robert Bartoszynski, South San Francisco, CA (US); Chung-Wei Yen, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 769 days.

(21) Appl. No.: 14/609,652

(22) Filed: Jan. 30, 2015

(65) Prior Publication Data
US 2016/0225014 A1   Aug. 4, 2016

(51) Int. Cl.
G06Q 30/00   (2012.01)
G06Q 30/02   (2012.01)

(52) U.S. Cl.
CPC ..... *G06Q 30/0244* (2013.01); *G06Q 30/0243* (2013.01)

(58) Field of Classification Search
CPC ................................................ G06Q 30/0244
See application file for complete search history.

(56) References Cited

U.S. PATENT DOCUMENTS

2010/0260426 A1* 10/2010 Huang .............. G06F 17/30247
                                                                    382/218
2010/0268661 A1* 10/2010 Levy ...................... G06Q 30/02
                                                                    705/347

(Continued)

OTHER PUBLICATIONS

Ng, "Feature selection, L1 vs. L2 regularization, and rotational invariance", Proceedings of the 21st Int'l Conf. on Machine Learning, Association for Computing Machinery, Jul. 2004.*

*Primary Examiner* — Bennett M Sigmond
*Assistant Examiner* — Scott C Anderson
(74) *Attorney, Agent, or Firm* — Bryan Cave Leighton Paisner LLP

(57) ABSTRACT

A system for building a targeted audience for a present online advertising campaign is disclosed. The system comprises a database for storing data related to each of the plurality of products with each product associated with a previous online advertising campaign and a processor in communication with the database and configured to execute computer-readable instructions causing the processor to utilize the data to identify at least one previous online advertising campaign as being similar to the present online advertising campaign, learn from the identified previous online advertising campaign(s) to predict a probability of conversion of each of a plurality of customers when exposed to an impression of the present online advertising campaign, and build the targeted audience for the present online advertising campaign based on the predicted probability of conversion. A method for building a targeted audience for a present online advertising campaign is also disclosed.

25 Claims, 3 Drawing Sheets

(56) References Cited

U.S. PATENT DOCUMENTS

| | | | | |
|---|---|---|---|---|
| 2012/0109711 A1* | 5/2012 | Boe | ............... | G06Q 30/02 |
| | | | | 705/7.31 |
| 2012/0310729 A1* | 12/2012 | Dalto | ............ | G06Q 30/02 |
| | | | | 705/14.43 |
| 2012/0323674 A1* | 12/2012 | Simmons | ............ | G06Q 30/02 |
| | | | | 705/14.41 |
| 2015/0149277 A1* | 5/2015 | Mankoff | ............ | G06Q 30/0261 |
| | | | | 705/14.45 |

* cited by examiner

SYSTEM AND METHOD FOR BUILDING A TARGETED AUDIENCE FOR AN ONLINE ADVERTISING CAMPAIGN

FIELD OF THE DISCLOSURE

The present disclosure relates generally to a system and method for building a targeted audience for a present online advertising campaign.

BACKGROUND

Online advertising campaigns are often used to advertise a particular company, service, and/or product through a coordinated series of advertisements or promotional marketing messages delivered to a targeted audience by way of an online or Internet-based marketing channel. Online advertising campaigns are typically used to boost awareness of the particular company, service, and/or product for purposes of generating a demand for the product, the service, and/or products and services of the company.

There are various ways of assessing the effectiveness of an online advertising campaign. One way of assessing the effectiveness of an online advertising campaign is by calculating a click-through rate (CTR). The click-through rate generally represents the number of clicks on an icon or hyperlink of an online advertisement per the number of times the advertisement was shown. Typically, a click-through rate of 0.2% or higher is indicative of an effective online advertising campaign. Although useful, the click-through rate does not take into account activity which occurs offline, such as data pertaining to transactions and/or consumer behavior that take place in an offline store. A targeted audience for an online advertising campaign which is developed solely utilizing the click-through rate is therefore limited to consumers and consumer activity that occurs online.

Another way of assessing the effectiveness of an online advertising campaign is to target a high conversion rate. However, conversion is often a delayed response compared to click-through rates, and it is typically difficult to learn from the same campaign as conversion occurs at a later part of the campaign. This is particularly true for conversion that takes place in an offline store. In some instances, the online advertising campaign is over before products are purchased and conversion can be properly assessed.

The present disclosure is aimed at solving the problems identified above.

SUMMARY

A system for building a target audience for a present online advertising campaign comprises a database for storing data for each of the plurality of products with each product associated with a previous online advertising campaign and a processor in selective communication with the database and configured to execute computer-readable instructions causing the processor to: utilize the data to identify at least one previous online advertising campaign as being similar to the present online advertising campaign; learn from the identified at least one previous online advertising campaign to predict a probability of conversion of each of a plurality of consumers when exposed to an impression of the present online advertising campaign; and build the targeted audience for the present online advertising campaign based on the predicted probability of conversion.

A method for building a targeted audience for a present online advertising campaign with one or more steps of the method being performed utilizing a processor. The method comprises the steps of obtaining product data related to each of a plurality of products with each product associated with a previous online advertising campaign; building a database including the data for each of the plurality of products; utilizing the data to identify at least one previous online advertising campaign as being similar to the present online advertising campaign; learning from the identified at least one previous online advertising campaign to predict a probability of conversion of each of a plurality of consumers when exposed to the present online advertising campaign; and building the targeted audience for the present online advertising campaign based on the predicted probability of conversion.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

DETAILED DESCRIPTION

Figure 1:
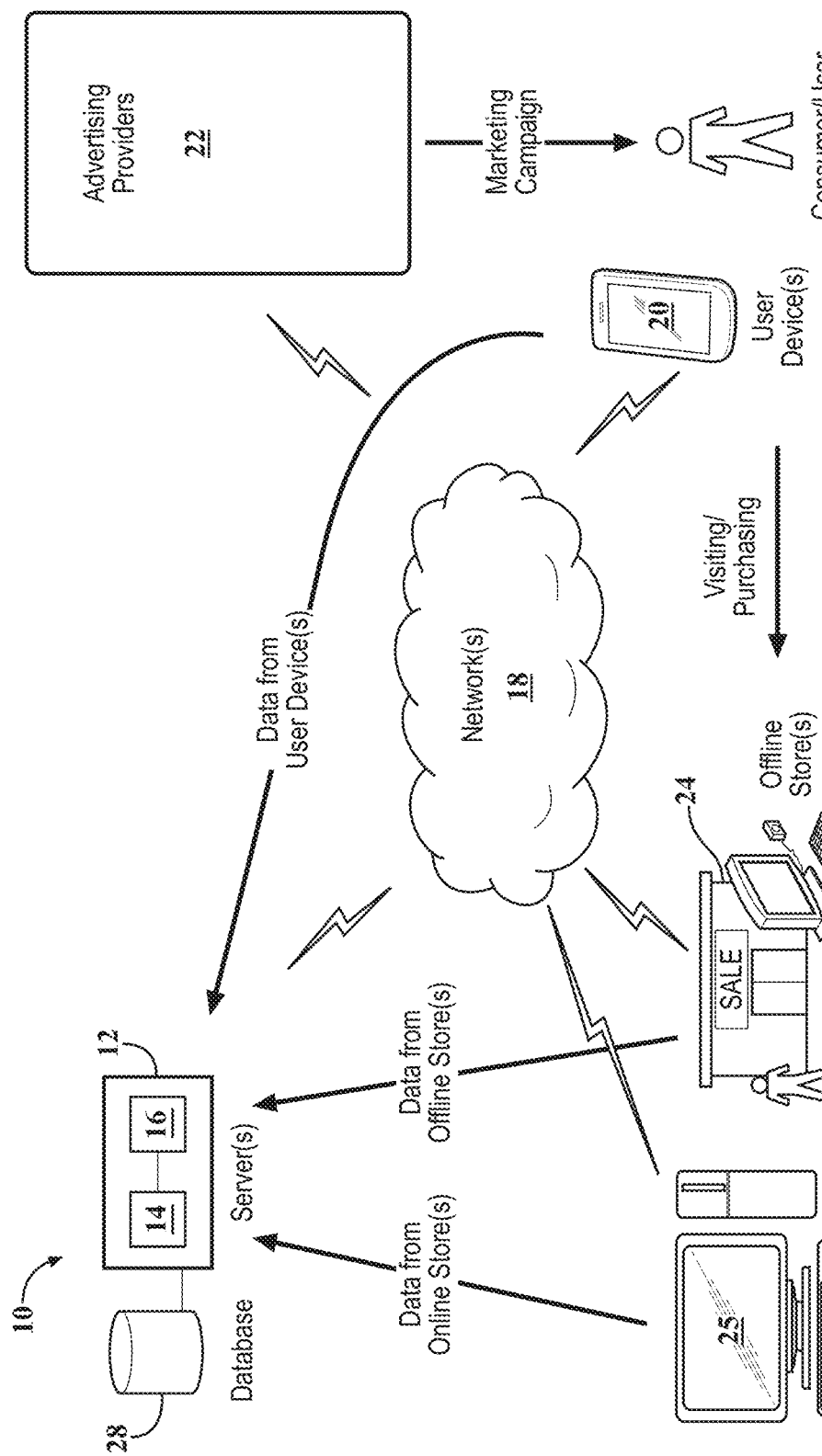
FIG. 1 is a schematic illustrating an example of a system for building a targeted audience for a present online advertising campaign.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagram(s) in the flow diagram(s) illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present disclosure particularly describes how to build a targeted audience for an online advertising campaign utilizing advertisement impression data related to previous online advertising campaign(s) and product conversion data obtained from online and/or offline sources. Particularly, the present disclosure describes how a system learns from advertisement impression data related to previous online advertising campaign(s) and/or product conversion data from online and offline sources to build a behaviorally targeted audience which is expected to convert at a high rate after being exposed to an impression of an online advertising campaign.

With reference to the figures and in operation, the present disclosure provides a system 10 and a method for building a targeted audience for an online advertising campaign.

An example of a system 10 which is usable for building a targeted audience for an online advertising campaign is shown in FIG. 1. The system 10 includes at least one server 12 with a processor 14 and a memory 16 operatively associated with the server(s) 12. The processor 14 may be a controller, a microcontroller, a microprocessor, an application specific integrated circuit (ASIC), or a processor working in conjunction with a central processing unit (CPU) performing the function of a general purpose computer. The processor 14 is configured to execute computer programs containing computer-readable and executable instructions for performing one or more steps of the method for building a targeted audience of a present online advertising campaign. In an example, the processor 14 is configured to execute a computer program containing computer-readable and executable instructions for performing all of the steps of a method for building a targeted audience for a present online advertising campaign. The memory 16 may include a read only memory (ROM) and random access memory (RAM) for storing the computer-readable instructions for performing the step(s) of the method.

The system 10 further includes one or more communication network(s) 18 that enable communication between the various computing devices of the system 10. The communication network(s) 18 may be used to establish any wired and/or wireless connection. Non-limiting examples of communication network(s) 18 include the Internet, a file transfer protocol (FTP), an Intranet, a local area network (LAN), a virtual private network (VPN), a cellular network, and a wide area network (WAN). The various communication networks 18 may be used alone or in conjunction with one another.

In an example, the communication network(s) 18 enables communication between the server(s) 12 and a user device 20. The user device 20 may be any suitable device that enables a user (such as a potential consumer) to access and communicate with the system 10 including sending and/or receiving data from the system 10 and displaying data received from the system 10 to the user. Non-limiting examples of user devices 20 include a laptop or notebook computer, a desktop computer, a tablet computer, a personal data assistant (PDA), an Internet-enabled mobile telephone (such as a smartphone), a hand-held mobile device such as a cellular phone, and/or the like.

The communication network(s) 18 also enables communication between the server(s) 12 and one or more advertising providers 22. The advertising providers 22 generally assist with implementing advertising campaigns using various forms of advertising media. Non-limiting examples of advertising media include advertising displays (e.g., signs, billboards, banners, etc.), online advertising media (e.g., web banners), radio advertising, television advertising, video game advertising, print advertising (e.g., advertisements printed in magazines, newspapers, etc.), short message service (SMS) advertising messages, electronic mail (email) advertising messages, etc. For online advertising campaigns, the advertising providers 22 assist with implementing the online advertising campaign using online advertising media.

The communication network(s) 18 also enables communication between the server(s) 12 and one or more online and/or offline sources. In an example, the offline source is an offline store 24, and the communication network(s) 18 enable communication between the server(s) 12 and one or more computing devices 23 of the offline store 24. The offline store 24 may include a physical location where products are kept for sale. Non-limiting examples of offline stores 24 include a retailer store, a restaurant, a gas station, a beauty salon, a fitness center, a grocery store, a convenience store, and/or the like. Typically, transactions occurring in an offline store involve the user physically visiting the store and purchasing one or more products from the store at that time. In some instances, the offline store(s) 24 has no online presence and/or is not integrated with a specified networked purchasing service. In another example, the online source is an online store 16, and the communication network(s) 18 enable communication between the server(s) 12 and one or more computing devices 25 of the online store 26. The online store(s) 26 may include any store that has an online presence, where users can purchase products online, for example, through a webpage associated with the online store 26. In yet another example, the online source is the user device 20, and the communication network(s) 18 enable communication between the server(s) 12 and the user device 20.

The server(s) 12 typically establish a connection with the network(s) 18 for purposes of obtaining data from the user device 20, the computing device(s) 23 of the offline store 24, and/or the computing device(s) 25 of the online store 26. The data obtained from the user device 20, the computing device(s) 23 of the offline store 24, and/or the computing device(s) 25 of the online store 26 may be related to products associated with one or more advertising campaigns and/or related to the advertising campaigns themselves. For example, the data may include online and/or offline product transaction data and/or data relating to consumer behavior(s) associated with various advertising campaigns. The transaction data may include specific elements of a transaction, such as price changes, sales orders, financial transactions, revenues, conversion rates, impression data, profits, and/or other transaction data associated with one or more products of the various advertising campaigns. Data related to consumer behavior associated with online and/or offline product transactions may be obtained, for example, from store receipts, credit card purchases, mail-order requests, information inquiries, browsers, cookies, and/or other sources related to customer preferences or predisposition to purchasing and/or using a particular product. The transaction data and/or the data related to consumer behavior further includes or may be used to obtain advertisement impression data and product conversion data, both of which may be used during a learning step of the method described in detail below.

As shown in FIG. 1, the system 10 further includes a database 28 coupled to the server(s) 12. The database 28 is configured to store the data, such as the advertisement impression data and product conversion data. In an example, the data may be obtained from the user device 20, the computing device(s) 23 of the offline stores 24, and/or the computing device(s) 25 of the online stores 26 by the server(s) 12, and the data may be stored in the database 28.

Figure 2:
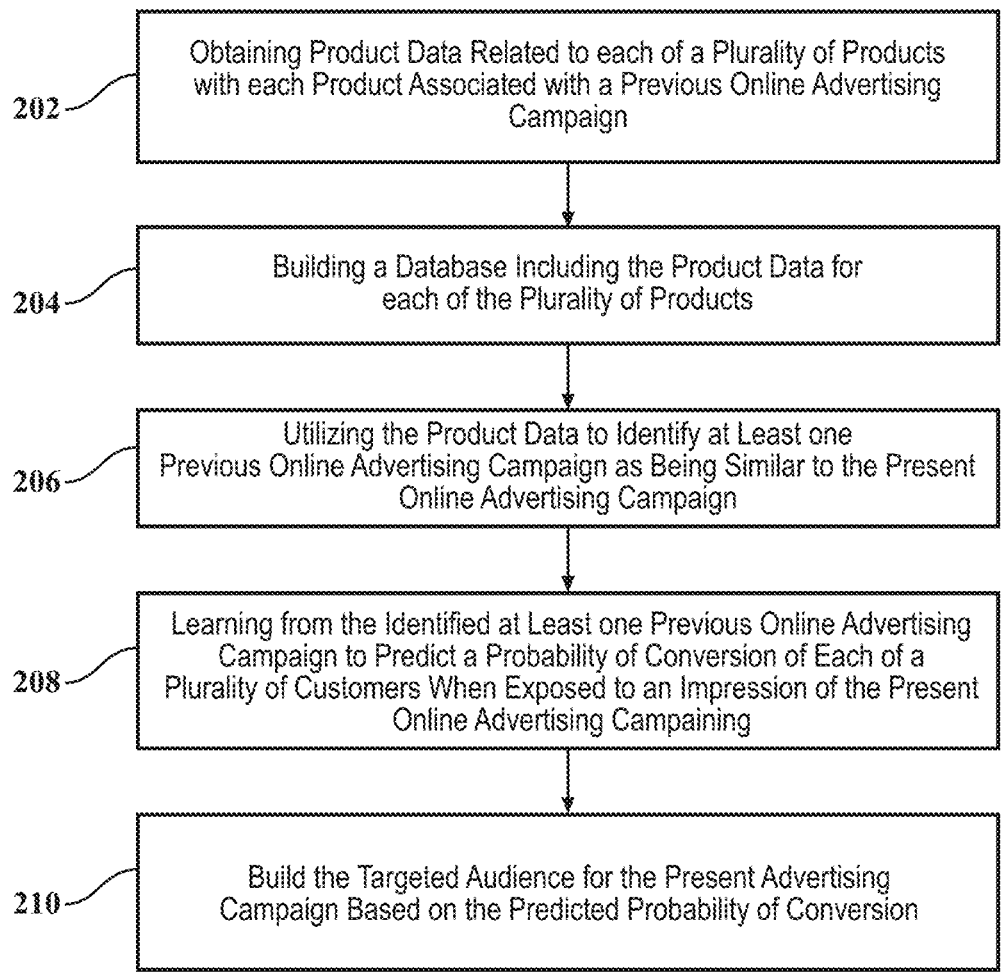
FIG. 2 is a flowchart of an example of a method for building a targeted audience for a present online advertising campaign.

Examples of the method for building a targeted audience for a present online advertising campaign is described below with reference to FIGS. 2 and 3. As shown in FIG. 2, the method generally includes obtaining data related to each of a plurality of products with each product associated with a previous online advertising campaign (as shown in method step 202), building a database including the data for each of the plurality of products (as shown in method step 204), utilizing the data to identify at least one of the previous online advertising campaigns as being similar to the present online advertising campaign (as shown in method step 206), learning from the identified at least one previous online advertising campaign to predict a probability of conversion of a product associated with the present online advertising campaign (as shown in method step 208), and building the targeted audience for the present online advertising campaign based on the probability of conversion (as shown in method step 210).

A specific example of the method is described below with reference to FIG. 3. It is to be understood that the method described below with reference to FIG. 3 includes a plurality of steps, which may be performed independently of, or in combination with other steps of the method. Furthermore, the steps of the method may be performed by one or a combination of components of the system 10.

Figure 3:
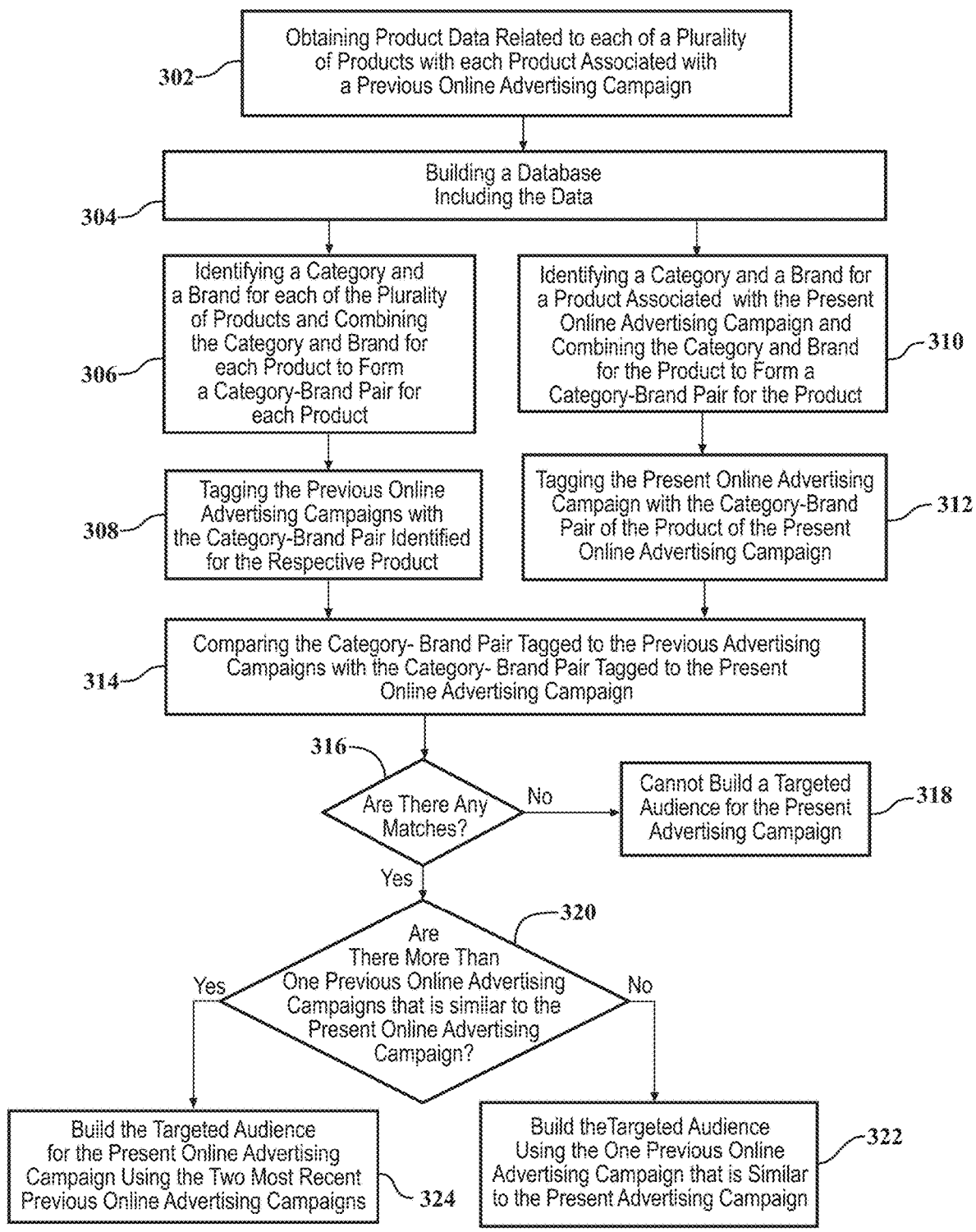
FIG. 3 is a flowchart of another example of a method for building a targeted audience for a present online advertising campaign.

As shown in FIG. 3, the method includes obtaining product data related to each of a plurality of products with each product associated with a previous online advertising campaign (as shown in method step 302). In an example, utilizing the communication network(s) 18, the server(s) 12 are configured to communicate with the online and/or offline sources, such as the user device 20, the computing device(s) 23 of the offline store(s) 24, and/or the computing device(s) 25 of the online store(s) 26. During this communication, the server(s) 12 are configured to obtain data directly from the user device 20, the computing device(s) 23 of the offline store(s) 24, and/or the computing device(s) 25 of the online store(s) 26. For example, during the communication, the server(s) 12 can monitor the online activity of the user device 20, the computing device(s) 23 of the offline store(s) 24, and/or the computing device(s) 25 of the online store(s) 26. The server(s) may be configured to continuously monitor the devices 20, 23, 25, or may be configured to periodically monitor the devices 20, 23, 25. In instances where the server(s) 12 is configured to periodically monitor the devices 20, 23, 25, the server(s) 12 may check the online activity of the devices 20, 23, 25 after each of a plurality of time intervals, such as every 5 minutes, every 30 minutes, every 1 hour, every 12 hours, etc. Alternatively, the server(s) 12 may periodically monitor the devices 20, 23, 25 by checking the online activity of the devices 20, 23, 25 in response to a trigger. For example, the server(s) 12 may be triggered to check the online activity of the devices 20, 23, 25 upon detecting or receiving a signal that one or more of the device(s) 20, 23, 25 has logged onto a particular website and/or accessed a particular retailer online such as by instant messaging, emailing the retailer, and/or the like. Alternatively, during the communication, the server(s) 12 can request data from the user device 20, the offline store 24, and/or the online store 26. The server(s) 12 can obtain a transmission of the data from one or more of the devices 20, 23, 25 to the server(s) 12 in response to the request.

In some instances, the data may not be readily available from an offline source. For example, the computing device(s) 25 of the offline store(s) 26 may not be connected or be able to connect through the communication network(s) 18, or the offline store(s) 26 does not have a computing device. The server(s) 12 may obtain the data by submitting a request to the offline store 26, for example, during a telephone call to the offline store(s) 26. The offline store(s) 26 may provide the requested data during the telephone call, and the data may be recorded as a voice recording and transcribed into text before being stored in the database 28. The offline store(s) 26 may alternatively provide the requested data in an email, an SMS message, a letter sent via postal mail, and/or the like.

The data obtained from the devices 20, 23, 25 may be utilized, by the processor 14 executing a computer program, to identify products and associated previous online advertising campaigns. The identified products and associated previous online advertising campaigns may be stored in the database 28.

Referring to FIG. 3, the method further includes building the database 28 including the data (as shown in step 304). In an example, the method step of building the database 28 comprises building a first dataset including category-brand pairs for each of the plurality of products stored in the database 28. This may be accomplished by identifying a category and a brand for each of the plurality of products, and combining the category and brand for each product to form a category-brand pair for each product (as shown in step 306). For example, the category-brand pair for an iPad® would be tablets-Apple Inc., the category-brand pair for Vitaminwater® would be sports drinks-Glacéau, the category-brand pair for Pledge® would be furniture polish-S.C. Johnson & Son Co., etc.

Once a category-brand pair has been identified for each of the plurality of products, the method further includes tagging the previous online advertising campaigns with the category-brand pair identified for the respective products (i.e., the product associated with that previous online advertising campaign) (as shown in step 308). Typically, each previous online advertising campaign is associated with at least one product. Said differently, typically, each previous online advertising campaign advertised at least one product. Accordingly, at least one product may be associated with one particular previous online advertising campaign. In instances where one product is associated with a particular previous online advertising campaign, that particular online advertising campaign is tagged with one category-brand pair (i.e., the category-brand pair of the one product). In instances where multiple products (e.g., two or more products) are associated with a particular online advertising campaign, that particular online advertising campaign is tagged with multiple category-brand pairs (i.e., the category-brand pair of the first product, the category-brand pair of the second product, etc.).

In an example, the method step of building the database 28 may further comprise building a second dataset containing data related to consumer behavior. For example, for each consumer who was exposed to an impression of an online advertising campaign, data may be stored in the database 28 as part of the second dataset where such data indicates that the consumer did or did not buy a product relevant to that online advertising campaign after seeing the impression within a predetermined time period. In an example, the predetermined time period may be the time period during which the online advertising campaign ran. In another example, the predetermined time period may be the time period during which the online advertising campaign ran and an amount of time (such as 5 days, 1 week, 2 weeks, etc.) after the online advertising campaign ended.

The second dataset may also include data indicating that a consumer purchased a product associated with a previous online advertising campaign after being exposed to an impression of the online advertising campaign, and data indicating that the purchase was made from an online store or an offline store. In instances where the consumer purchased the product associated with the online advertising campaign from an online store 26 (such as, e.g., from Walmart.com), the data may be stored in the database 28 as part of the second dataset signifying that the consumer purchased the product from the online store 26. In instances where the consumer purchased the product associated with the online advertising campaign from an offline store 24 (such as, e.g., a Walmart store), the data may be stored in the database 28 as part of the second dataset signifying that the consumer purchased the product from the offline store 24. In an example, sales revenue associated with the purchased product may also be stored in the database 28 as part of the second dataset.

The method further includes forming a category-brand pair for the product associated with the present online advertising campaign. This may be accomplished by identifying a category and a brand for the product associated with the present online advertising campaign, and combining the category and brand for the product to form a category-brand pair for the product (as shown in step 310). Once a category-brand pair has been identified for the product of the present online advertising campaign, the method includes tagging the present online advertising campaign with the category-brand pair identified for the product of the present online advertising campaign (as shown in step 312).

As previously mentioned, the method of the present disclosure may be used for building a targeted audience for a present online advertising campaign. A high conversion rate is expected after users or potential consumers, who are members of the targeted audience, have been exposed to an impression of the present online advertising campaign. It is to be understood that the conversion rate depends, at least in part, on the type of product(s) being advertised and the duration of the adverting campaign which advertised the product(s). Typically, a high conversion rate is a higher than average conversion rate achieved by other methods of building a targeted audience for the same advertising campaign. For example, if other methods of building a targeted audience for an advertising campaign which advertises Product X is calculated to be 0.1%, then a high conversion rate is considered to be any percentage that is greater than 0.1%.

In an example, a targeted audience may be built by identifying previous online advertising campaigns that are similar to the present online advertising campaign, and utilizing advertisement impression data and product conversion data obtained from online and/or offline sources to predict a probability of conversion of the product associated with the present online advertising campaign. The probability of conversion is a quantitative measure of the chance that a user or consumer will convert (i.e., purchase the product associated with the present online advertising campaign) online or offline within a predetermined time period (e.g., 1 week, 2 weeks, 1 month, etc.) after being exposed to an advertisement of the present online advertising campaign. Said differently, the probability of conversion is a measure of the propensity of a user or consumer to buy a product advertised within a predetermined time period after being exposed to an impression of the online advertising campaign. The probability of conversion is typically a number from 0 to 1. The targeted audience for the present online advertising campaign may then be built having a particular size (e.g., a particular number of audience members) having the highest probability of conversion. It is to be understood that the size of the targeted audience may be adjusted according to need such as, for example, the number of impressions needed to be delivered to the targeted audience within a particular time period.

Referring again to FIG. 3, the method includes comparing the category-brand pair tagged to the previous online advertising campaigns with the category-brand pair tagged to the present online advertising campaign (as shown in step 314). The method involves determining if there are any matches, i.e., determining if any of the previous online advertising campaigns is/are tagged with a category-brand pair that is common with the category-brand pair of the present online advertising campaign. This step is shown in method step 316. In instances where there are no matches (i.e., there are no previous online advertising campaigns tagged with a common category-brand pair as the present online advertising campaign), then a targeted audience cannot be built for the present online advertising campaign (as shown in step 318). However, in instances where there is at least one match (i.e., there is at least one previous online campaign tagged with a common category-brand pair as the present online advertising campaign), then the previous online advertising campaign(s) is considered to be similar to the present online advertising campaign.

Once the previous online advertising campaign(s) has been identified as being similar to the present online advertising campaign, the method includes determining if there are more than one previous online advertising campaign that has been identified as being similar to the present online advertising campaign (as shown in step 320). In instances where there is one previous online advertising campaign(s) that has been identified as being similar to the present online advertising campaign, the method includes determining the targeted audience for the present online advertising campaign using the one previous online advertising campaign that is similar to the present online advertising campaign (as shown in step 322). Details of the method step of building the targeted audience for the present online advertising campaign using the one previous online advertising campaign are described below.

In an example, the method includes learning from the previous online advertising campaign that is similar to the present online advertising campaign to predict a probability of conversion of a consumer when exposed to an impression of the present online advertising campaign. A targeted audience for the present online advertising campaign may be built based on the predicted probability of conversion for each of a plurality of consumers. For example, advertisement impression data related to the previous online advertising campaign and product conversion data related to the product associated with the previous online advertising campaign may be utilized in a L1-regularized logistic regression model to predict the probability of conversion of each consumer when exposed to an impression of the present online advertising campaign. In general, L1-regularized logistic regression is a standard technique for modeling and predicting binary responses based on information about a set of regressor variables. The L1-regularized logistic regression model may be defined by Equation (1):

$$p(y=1 \mid X; \theta) = \frac{1}{1 + \exp(-\theta^T \cdot X)} \quad \text{Equation (1)}$$

where y is the response variable, X is a vector of regressor variables, θ is the vector of regression coefficients, and p(y=1|X; θ) denotes the probability that y=1 given the regressor variables X and regression coefficient vector θ. T is the transpose of the vector of the regression coefficients θ. Since there are an M number of data points, L1-regularized logistic regression attempts to maximize a regularized likelihood function defined by Equation (2):

$$\max_{\theta} \sum_{i=1}^{M} \log(p(y=y^i \mid X^i; \theta)) - \lambda \|\theta\|_1 \quad \text{Equation (2)}$$

where λ is the Lagrange multiplier and is greater than 0, $y^i$ is the i-th response variable and $X^i$ is the regressor variable values corresponding to the i-th response.

Since one previous online advertising campaign was identified in the current example as being similar to the present online advertising campaign, the data related to the previous online advertising campaign may be divided up into three parts—a first part which is used for training purposes, a second part which is used for validation purposes, and a third part which is used for testing purposes. The first part is referred to as the training group, and is used to estimate the regressor coefficients, θ, for different values of λ. More particularly, the value of θ may be determined by maximizing Equation (2) for certain choices of λ, where Equation (2) is utilized multiple times for various choices of λ to determine the corresponding values of θ.

The second part of the data related to the one previous online advertising campaign is referred to as the validation group. More particularly, the validation group is utilized to determine which choice of λ (and corresponding value of θ) should be used for predicting the probability of conversion of the consumer when exposed to an impression of the present online advertising campaign. As described above, during training, corresponding values of θ were determined for each λ tested. During validation, the probability of conversion may be predicted for each choice of λ using the L1-regularized logistic regression model (i.e., Equation (1)) above.

Additionally, for the L1-regularized regression model, the regressor variables (or regressors), X, may be obtained utilizing the data stored in the database 28, particularly previous online and offline purchases, previous online browses, and/or reactions to previous online advertising campaigns which ran within a predetermined time period (e.g., 6 months, 1 year, 2 years, etc.). For previous online purchases, categories and subcategories of products purchased by consumers within a particular time frame (e.g., within 2 months, 3 months, etc.) before the previous online advertising campaign started are stored in the database 28 as category-subcategory pairs. Further, each category-subcategory pair corresponds with a particular regressor variable, X. In an example, if a consumer purchased a product offline that falls within a particular category-subcategory pair within the particular time frame prior to when the previous online advertising campaign started, then the regressor variable, X, is given a value of 1. In instances where no purchases were made for a product that falls within the particular category-subcategory pair within the particular time frame prior to when the previous online advertising campaign started, then the regressor variable, X, is given a value of 0. It is to be understood that the regressor variables may also be built for each category-subcategory pair for all online purchases and browses. Also, 3 months prior to the start of the online advertising campaign is the time frame typically considered for online purchases, while 30 to 40 days prior to the start of the online advertising campaign is the time frame typically considered for online browses.

Reactions to previous online advertising campaigns for the same brand as the product of the present online advertising campaign may also be used when building regressor variables. For previous online advertising campaigns tagged with the same brand as the present online advertising campaign, if a consumer was exposed to an impression and purchased a relevant product within the campaign period or two weeks after the campaign ended, then the regressor value representing the reaction is given a value of +1. Alternatively, for previous online advertising campaigns tagged with the same brand as the present online advertising campaign, if a consumer was exposed to an impression and did not purchase a relevant product within the campaign period or two weeks after the campaign ended, then the regressor value representing the reaction is given a value of −1. For each category, the reactions from the previous online advertising campaigns tagged to that category are summed up. It is to be understood that since the previous online advertising campaigns being considered are for the same brand of product, the online advertising campaigns with matching categories will also be tagged to the same category-brand pair. Accordingly, for previous online advertising campaign reactions, each category corresponds to a variable (e.g., +1) if there are previous online advertising campaigns of the same brand in that category, otherwise the variable is assumed to have a value of 0.

Utilizing the regressor variables, X, described above, the predicted probability of conversion for each choice of $\lambda$ is then compared to a plurality of preset threshold conversion values (e.g., a 35% conversion, a 50% conversion, a 62% conversion, etc.). In instances where the predicted probability of conversion is greater than a particular threshold value, the consumer response is predicted to have a value of +1 indicating that the consumers of the validation group are likely to convert. In instances where the predicted probability of conversion is less than the particular threshold value, the consumer response is predicted to have a value of −1 indicating that the consumers of the validation group are not likely to convert. A prediction error is determined for various threshold conversion values for each choice of $\lambda$. For example, with the value of $\lambda$ fixed, the prediction error may be determined for each threshold conversion value. The value of $\lambda$ which achieves the lowest overall prediction error is used for predicting the probability of conversion. Furthermore, the value of $\theta$ which corresponds to the selected value of $\lambda$, as well as the regressor variables, X, described above are used for predicting the probability of conversion of a consumer when exposed to an impression of the present online advertising campaign.

Once the value of $\lambda$ and its corresponding value of $\theta$ have been selected for each consumer, utilizing the testing group, the method includes testing the selected value of $\lambda$ to confirm that the selected value of $\lambda$ can be used to objectively predict the probability of conversion of a consumer. This may be accomplished by determining the prediction error as described above except by keeping the value of $\theta$ constant.

Utilizing the selected value of $\lambda$, its corresponding value of $\theta$, and the regressor variables, X (computed based on the latest purchase, browse, and advertisement reaction data as described above), the method involves predicting the probability of conversion of a consumer when exposed to an impression of the present online advertising campaign utilizing Equation (1) above. For example, the probability of conversion utilizing the selected value of $\lambda$ and the corresponding $\theta$ obtained during training and validation (and confirmed during testing) and the regressor variables, X, may be predicted utilizing the L1-regularized logistic regression model described above.

Once the probability of predicting the conversion has been computed, the method involves building a targeted audience of a particular size for the present online advertising campaign based on the predicted probability of conversion for each of a plurality of consumers when exposed to an impression of the present online advertising campaign. In an example, the targeted audience includes the consumers having a predicted probability of conversion that is the highest.

Referring back to method step 320 in FIG. 3, if it is determined that there is more than one previous online advertising campaign that is similar to the present online advertising campaign, then the method includes utilizing the two most recent previous online advertising campaigns for building the targeted audience for the present online advertising campaign. In an example, the method includes determining which two of the more than one previous online advertising campaign are the most recent. Of the two most recent previous online advertising campaigns, the more recent campaign of the two may be used for validation and testing purposes, while the remaining previous online advertising campaign may be used for training purposes. In an example, from the most recent previous online advertising campaign, 25% of the responses are randomly selected and used as a test group and another 25% of the responses are randomly selected and used as a validation group. Further, all of the responses (i.e., 100% of the responses) of the remaining previous online advertising campaign may be used as the training group. The method further includes building the targeted audience of the present online advertising campaign using the two most recent previous online advertising campaigns (as shown in step 324).

It is to be understood that when building the targeted audience by predicting conversion by training the L1-regularized logistic regression model, the following assumptions may be made. First, the data being trained utilizing the model covers a subset of the entire consumer population. Although the subset is not representative of the entire consumer population, it is assumed that the trained L1-regularized logistic regression model produces a valid result which is applicable to the entire consumer population. Second, although the method involves training the model to determine a conversion rate of a previous similar campaign, learning from the previous similar campaign produces valid results for the present online advertising campaign.

The following example is provided for purposes of illustrating the training, validation, testing, and predicting steps utilized when building the targeted audience for the present online advertising campaign. Assuming that the present online advertising campaign is for Hallmark® greeting cards, the targeted audience may be built as follows. The product(s) relevant to the campaign are identified (e.g., particular greeting cards), and a category and a brand are identified for the product(s). For example, "greeting cards" would be the category and "Hallmark" would be the brand for these product(s). The database 28 may be searched to locate previous online advertising campaigns tagged with the category-brand pair "greeting cards—Hallmark®". If a previous online advertising campaign cannot be found, then a targeted audience for the present campaign cannot be built. However, if a previous online advertising campaign is found, then consumer responses from that previous online advertising campaign (which are stored in the database 28) is divided to form training, validation, and testing groups. A targeted audience for the present online advertising campaign may be built in this example by training, validating, and testing is performed as described above to obtain a value of θ. Once the value of θ obtained, the method of predicting the probability of conversion for all consumers is accomplished utilizing Equation (1) above with regressor variables, X, constructed from the latest purchase, browse data, etc. Then, a targeted audience of a fixed or particular size is chosen from the entire consumer population and includes consumers having a predicted probability of conversion which is the highest.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for building a targeted audience for a present online advertising campaign for a product, the system comprising:
   a database for storing data related to a plurality of products associated with previous online advertising campaigns, the plurality of products comprising the product;
   one or more non-transitory memory storage systems storing computer-readable instructions configured to run on one or more processors; and
   the one or more processors in selective communication with the database and configured to execute the computer-readable instructions causing the one or more processors to:
   retrieve a respective one of one or more category-brand pairs for the product associated with the present online advertising campaign;
   utilize the respective one of the one or more category-brand pairs for the product associated with the present online advertising campaign to identify a respective common category-brand pair of the one or more category-brand pairs for the product associated with at least a respective one of the previous online advertising campaigns as being similar to the present online advertising campaign, wherein the targeted audience for the present online advertising campaign is built based on the respective common category-brand pair;
   determine a first dataset from the data comprising at least an average conversion rate for the respective one of the one or more category-brand pairs for the product associated with the at least the respective one of the previous online advertising campaigns, wherein the average conversion rate depends on at least a respective duration of the previous online advertising campaigns for a predetermined period of time;
   determine a second dataset from the data comprising a consumer-specific conversion rate for each respective one of the one or more category-brand pairs for each respective one of a plurality of consumers based on online and offline sources comprising past purchasing behavior and a browsing history of the each respective one of the plurality of consumers, wherein the past purchasing behavior and the browsing history of the each respective one of the plurality of consumers used to determine the consumer-specific conversion rate are unrelated to the present online advertising campaign and the product, and wherein the consumer-specific conversion rate is a function of a quantity of the plurality of consumers that purchased a first product associated with the each respective one of the one or more category-brand pairs when exposed to an impression of a respective one or more of the previous online advertising campaigns;
   train an L1-regularized logistic regression model by using, for the each respective one of the plurality of consumers, input data comprising the average conversion rate of the first dataset, the consumer-specific conversion rate of the second dataset, impression data of the at least the respective one of the previous online advertising campaigns, and conversion data of the at least the respective one of the previous online advertising campaigns, wherein output data for the L1-regularized logistic regression model comprises respective indications of whether the each respective one of the plurality of consumers purchased the product after being exposed to an impression of the present online advertising campaign;
   generate, utilizing the L1-regularized logistic regression model, as trained, a respective prediction of a probability of conversion of the each respective one of the plurality of consumers for the product when the each respective one of the plurality of consumers is exposed to the impression of the present online advertising campaign;
   determine an indicator based on the respective prediction of the probability of conversion by building a regressor variable for the each respective one of the one or more category-brand pairs and comparing the regressor variable to a preset threshold conversion value, wherein when the indicator is greater than 1, the respective prediction of the probability of conversion is greater than the preset threshold conversion value for the each respective one of the one or more category-brand pairs; and
   build the targeted audience for the present online advertising campaign based on a higher than average respective prediction of the probability of conversion for the respective one of the one or more category-brand pairs associated with the product for the at least the respective one of the previous online advertising campaigns.

2. The system of claim 1 further comprising:
   a server operatively coupled to the one or more processors and the database, the server being configured to cause the one or more processors to:
   communicate with at least one of an offline source or an online source; and
   automatically retrieve the data from the at least one of the offline source or the online source, wherein the database comprises the at least one of the offline source or the online source.

3. The system of claim 1, further comprising:
a server operatively coupled to the one or more processors and the database, the server being configured to cause the one or more processors to:
communicate with at least one of an offline source or an online source to_ request the data from the at least one of the offline source or the online source; and
receive a transmission of the data from the at least one of the offline source or the online source in response to the request, wherein the database comprises the at least one of the offline source or the online source.

4. The system of claim 1, wherein the one or more processors are further configured to execute computer-readable instructions causing the one or more processors to:
build the database including the data related to each respective one of the plurality of products.

5. The system of claim 4, wherein the one or more processors are further configured to execute computer-readable instructions causing the one or more processors to:
build the first dataset of the database by causing the one or more processors to:
identify a category and a brand for the each respective one of the plurality of products;
combine (i) the category, as identified, for an identified product of the plurality of products, and (ii) the brand, as identified for the identified product of the plurality of products, to form a category-brand pair for the identified product of the plurality of products, a respective one or more category-brand pairs comprising the category-brand pair for the identified product of the plurality of products;
tag the at least the respective one of the previous online advertising campaigns associated with the plurality of products with the category-brand pair of the identified product of the plurality of products; and
store the at least the respective one of the previous online advertising campaigns, as tagged, in the database.

6. The system of claim 5, wherein the one or more processors are further configured to execute computer-readable instructions causing the one or more processors to:
identify the at least the respective one of the previous online advertising campaigns as being similar to the present online advertising campaign by causing the one or more processors to:
tag the present online advertising campaign with the respective one or more category-brand pairs for the product associated with the present online advertising campaign;
compare the respective one or more category-brand pairs associated with the present online advertising campaign, as tagged, with the respective one or more category-brand pairs associated with the at least the respective one of the previous online advertising campaigns, as tagged; and
determine that the at least the respective one of the previous online advertising campaigns, as tagged, is similar to the present online advertising campaign, as tagged, when the respective one or more category-brand pairs associated with the at least the respective one of the previous online advertising campaigns, as tagged, match the respective one or more category-brand pairs associated with the present online advertising campaign, as tagged.

7. The system of claim 6, wherein the one or more processors are further configured to execute computer-readable instructions causing the one or more processors to:
create the category-brand pair of the respective one or more category-brand pairs for the product associated with the present online advertising campaign by causing the one or more processors to:
combine the category, as identified for the product, and the brand, as identified for the product, to form the respective one or more category-brand pairs for the product of the present online advertising campaign.

8. The system of claim 6, wherein the data includes consumer responses and the one or more processors are further configured to execute computer-readable instructions causing the one or more processors to:
determine that the respective one or more category-brand pairs associated with the respective one of the previous online advertising campaigns, as tagged, matches the respective one or more category-brand pairs associated with the present online advertising campaign, as tagged;
divide the consumer responses of the respective one of the previous online advertising campaigns, as tagged, into a training group, a validation group, and a testing group; and
perform training, validation, and testing utilizing the training group, the validation group, and the testing group, respectively.

9. The system of claim 6, wherein the one or more processors are further configured to execute computer-readable instructions causing the one or more processors to:
determine that the respective one or more category-brand pairs associated with more than the respective one of the previous online advertising campaigns, as tagged, matches the respective one or more category-brand pairs associated with the present online advertising campaign, as tagged;
determine which two of the previous online advertising campaigns, as tagged, are most recent;
formulate a validation group and a testing group from one of the two of the previous online advertising campaigns;
formulate a training group from a remaining one of the two of the previous online advertising campaigns, as tagged; and
perform training, validation, and testing utilizing the training group, the validation group, and the testing group, respectively.

10. The system of claim 1, wherein the one or more processors are further configured to execute computer-readable instructions causing the one or more processors to:
build the second dataset of the database including data related to consumer behavior.

11. The system of claim 1, wherein the one or more processors are further configured to execute computer-readable instructions causing the one or more processors to:
predict the respective prediction of the probability of conversion for the each respective one of the plurality of consumers for the product when the plurality of consumers is exposed to the impression of the present online advertising campaign within a predetermined time period.

12. The system of claim 1, wherein the respective prediction of the probability of conversion utilizes the L1-regularized logistic regression model defined by:

$$p(y=1 \mid X; \theta) = \frac{1}{1 + \exp(-\theta^T \cdot X)},$$

where y is a response variable, X is a vector of regressor variables, θ is a vector of regression coefficients, p(y=1|X;θ) denotes a probability that y=1 given the vector of regressor variables X and the vector of regression coefficients θ, and T is a transpose of the vector of regression coefficients θ;

where a particular regressor variable of the vector of regressor variables X is built for each respective category of category-brand pairs for online purchases and online browses; and where the vector of regressor variables X comprises the regressor variable.

13. A method for building a targeted audience for a present online advertising campaign for a product being performed utilizing a processor, the method comprising:

obtaining, with a computer system using one or more processors, data related to each respective one of a plurality of products with each respective product associated with previous online advertising campaigns, the plurality of products comprising the product;

building, with the computer system, a database including the data for each respective one of the plurality of products;

retrieving, with the computer system, a respective one of one or more category-brand pairs for the product associated with the present online advertising campaign;

utilizing, with the computer system, the respective one of the one or more category-brand pairs for the product associated with the present online advertising campaign to identify a respective common category-brand pair of the one or more category-brand pairs for the product associated with at least a respective one of the previous online advertising campaigns as being similar to the present online advertising campaign, wherein the targeted audience for the present online advertising campaign is built based on the respective common category-brand pair;

determining, with the computer system, a first dataset from the data comprising at least an average conversion rate for the respective one of the one or more category-brand pairs for the product associated with the at least the respective one of the previous online advertising campaigns, wherein the average conversion rate depends on at least a respective duration of the previous online advertising campaigns for a pre-determined period of time;

determining, with the computer system, a second dataset from the data comprising a consumer-specific conversion rate for each respective one of the one or more category-brand pairs for each respective one of a plurality of consumers based on online and offline sources comprising past purchasing behaviors and a browsing history of the each respective one of the plurality of consumers, wherein the past purchasing behavior and the browsing history of the each respective one of the plurality of consumers used to determine the consumer-specific conversion rate are unrelated to the present online advertising campaign and the product, and wherein the consumer-specific conversion rate is a function of a quantity of the plurality of consumers that purchased a first product associated with the each respective one of the one or more category-brand pairs when exposed to an impression of a respective one or more previous online advertising campaigns;

training an L1-regularized logistic regression model by using, for the each respective one of the plurality of consumers, input data comprising the average conversion rate of the first dataset, the consumer-specific conversion rate of the second dataset, impression data of the at least the respective one of the previous online advertising campaigns, conversion data of the at least the respective one of the previous online advertising campaigns, wherein output data for the L1-regularized logistic regression model comprises respective indications of whether the each respective one of the plurality of consumers purchased the product after being exposed to an impression of the present online advertising campaign;

generating, utilizing the L1-regularized logistic regression model, as trained, with the computer system, a respective prediction of a probability of conversion of the each respective one of the plurality of consumers for the product when the each respective one of the plurality of consumers is exposed to the impression of the present online advertising campaign;

determine an indicator based on the respective prediction of the probability of conversion by building a regressor variable for the each respective one of the one or more category-brand pairs and comparing the regressor variable to a preset threshold conversion value, wherein when the indicator is greater than 1, the respective prediction of the probability of conversion is greater than the preset threshold conversion value for the each respective one of the one or more category-brand pairs; and building, with the computer system, the targeted audience for the present online advertising campaign based on a higher than average respective prediction of the probability of conversion for the respective one of the one or more category-brand pairs associated with the product for the at least the respective one of the previous online advertising campaigns.

14. The method of claim 13, wherein obtaining, with the computer system, the data further comprises:

monitoring online activity of at least one of an online source or an offline source; and automatically retrieving the data from the at least one of the online source or the offline source, wherein the database comprises the at least one of the offline source or the online source.

15. The method of claim 13, wherein obtaining, with the computer system, the data further comprises:

requesting the data from at least one of an online source or an offline source in response to requesting the data, wherein the database comprises the at least one of the offline source or the online source.

16. The method of claim 13, wherein building, with the computer system, the database further comprises building the first dataset including category-brand pairs for the each respective one of the plurality of products.

17. The method of claim 16, wherein building, with the computer system, the first dataset further comprises:

identifying a category and a brand for the each respective one of the plurality of products;

combining the category, as identified for an identified product of the plurality of products, and the brand, as identified for the identified product of the plurality of products, to form a category-brand pair for the identified product of the plurality of products, the respective one of the one or more category-brand pairs comprising the category-brand pair for the identified product of the plurality of products;

tagging the at least the respective one of the previous online advertising campaigns associated with the plurality of products with the category-brand pair of the identified product of the plurality of products; and storing the at least the respective one of the previous online advertising campaigns, as tagged, in the database.

18. The method of claim 17, wherein utilizing, with the computer system, the respective one of the one or more category-brand pairs for the product associated with the present online advertising campaign to identify the respective common category-brand pair of the one or more category-brand pairs for the product associated with the at least the respective one of the previous online advertising campaigns as being similar to the present online advertising campaign further comprises:

tagging the present online advertising campaign with the respective one or more category-brand pairs for the product associated with the present online advertising campaign;

comparing the respective one or more category-brand pairs associated with the present online advertising campaign, as tagged, with the respective one or more category-brand pairs associated with the at least the respective one of the previous online advertising campaigns, as tagged, stored in the database; and determining that the at least the respective one of the previous online advertising campaigns, as tagged, is similar to the present online advertising campaign, as tagged, when the respective one or more category-brand pairs associated with the at least the respective one of the previous online advertising campaigns, as tagged, match the respective one or more category-brand pairs associated with the present online advertising campaign, as tagged.

19. The method of claim 18, further comprising creating, with the computer system, the category-brand pair of the product associated with the present online advertising campaign by:

combining the category, as identified for the product, and the brand, as identified for the product, to form the respective one or more category-brand pairs for the product associated with the present online advertising campaign, as tagged.

20. The method of claim 18, wherein the data includes consumer responses and the method further comprises:

determining that the respective one or more category-brand pairs associated with the respective one of the previous online advertising campaign, as tagged, matches the respective one or more category-brand pairs associated with the present online advertising campaign, as tagged;

dividing the consumer responses of the respective one of the previous online advertising campaigns, as tagged, into a training group, a validation group, and a testing group; and performing training, validating, and testing utilizing the training group, the validation group, and the testing group, respectively.

21. The method of claim 18, further comprising:

determining, with the computer system, that the respective one or more category-brand pairs of more than the respective one of the previous online advertising campaigns, as tagged, match the respective one or more category-brand pairs associated with the present online advertising campaign, as tagged;

determining, with the computer system, which two of the previous online advertising campaigns, are most recent;

formulating, with the computer system, a validation group and a testing group from one of the two of the previous online advertising campaigns;

formulating, with the computer system, a training group from a remaining one of the two of the previous online advertising campaigns, as tagged; and performing, with the computer system, training, validating, and testing utilizing the training group, the validation group, and the testing group, respectively.

22. The method of claim 13, wherein building, with the computer system, the database further comprises building the second dataset including data related to consumer behavior.

23. The method of claim 22, wherein building, with the computer system, the second dataset further comprises:

determining, with the computer system, that a consumer purchased a product associated with the at least the respective one of the previous online advertising campaigns after being exposed to an impression of the at least the respective one of the previous online advertising campaigns within a predetermined time period;

determining, with the computer system, when the consumer purchased the product associated with the at least the respective one of the previous online advertising campaigns from an online source or an offline source;

when the consumer purchased the product associated with the at least the respective one of the previous online advertising campaigns from the online source, storing, with the computer system, data in the database signifying that the consumer purchased the product associated with the at least the respective one of the previous online advertising campaigns from the online source; and when the consumer purchased the product associated with the at least the respective one of the previous online advertising campaigns from the offline source, storing, with the computer system, data in the database signifying that the consumer purchased the product associated with the previous online advertising campaigns from the offline source.

24. The method of claim 13, wherein generating, with the computer system, the respective prediction of the probability of conversion of the each respective one of the plurality of consumers for the product when the plurality of consumers is exposed to the impression of the present online advertising campaign further comprises the respective prediction of the probability of conversion of the each respective one of the plurality of consumers when exposed to the impression of the present online advertising campaign within a predetermined time period.

25. The method of claim 13, wherein the respective prediction of the probability of conversion utilizing the L1-regularized logistic regression model defined by:

$$p(y=1\mid X;\theta) = \frac{1}{1+\exp(-\theta^T \cdot X)},$$

where y is a response variable, X is a vector of regressor variables, $\theta$ is a vector of regression coefficients, $p(y=1|X;\theta)$ denotes a probability that y=1 given the vector of regressor variables X and the vector of regression coefficients $\theta$, and T is a transpose of the vector of regression coefficients $\theta$;

where a particular regressor variable of the vector of regressor variables X is built for each respective category of category-brand pairs for online purchases and online browses; and where the vector of regressor variables X comprises the 5 regressor variable.

* * * * *